(12) United States Patent
Vudathu et al.

(10) Patent No.: US 12,737,497 B2
(45) **Date of Patent: *Sep. 15, 2026**

(54) SYSTEMS AND METHODS FOR PROCESSING CHECKS WITH MACHINE-READABLE OPTICAL LABELS

(71) Applicant: JPMORGAN CHASE BANK, N.A., New York, NY (US)

(72) Inventors: Raghu Vudathu, Downingtown, PA (US); Christy Lillie, Ann Arbor, MI (US); Bodhi Hwang, Forest Hills, NY (US); Joe Martei, Brooklyn, NY (US); Mark Lanter, Woodside, NY (US); Michael Parker, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 86 days.

This patent is subject to a terminal disclaimer.

(21) Appl. No.: 18/968,953

(22) Filed: Dec. 4, 2024

(65) Prior Publication Data

US 2025/0094631 A1 Mar. 20, 2025

Related U.S. Application Data

(63) Continuation of application No. 17/663,174, filed on May 12, 2022, now Pat. No. 12,189,810.

(51) Int. Cl.

| | |
|---|---|
| ***G06F 21/62*** | (2013.01) |
| ***G06K 19/06*** | (2006.01) |
| ***H04L 9/08*** | (2006.01) |

(52) U.S. Cl.
CPC ... *G06F 21/6245* (2013.01); *G06K 19/06009* (2013.01); *H04L 9/0825* (2013.01)

(58) Field of Classification Search
CPC .............. H04L 9/0825; G06F 21/6245; G06K 19/06009
USPC ........................................................... 726/27
See application file for complete search history.

(56) References Cited

U.S. PATENT DOCUMENTS

| | | | | |
|---|---|---|---|---|
| 6,390,362 B1 * | 5/2002 | Martin | ................. | G07D 7/0043 235/379 |
| 11,055,674 B1 * | 7/2021 | Hart | ................... | G06Q 20/3223 |
| 11,790,116 B2 * | 10/2023 | Daub | ................ | G06Q 30/0246 705/14.45 |

* cited by examiner

*Primary Examiner* — Hee Soo Kim
(74) *Attorney, Agent, or Firm* — GREENBERG TRAURIG LLP

(57) ABSTRACT

Systems and methods for processing checks with machine-readable optical labels are disclosed. In one embodiment, a method for processing checks with machine-readable optical labels may include (1) receiving, by a presenting bank computer program executed by an electronic device, a check comprising a machine-readable optical label printed thereon, wherein the machine-readable optical label comprises a payor bank routing number that is encrypted with a private key for a payor bank; (2) reading, by the presenting bank computer program, the machine-readable optical label; (3) decrypting, by the presenting bank computer program, the machine-readable optical label using a public key corresponding to the private key; (4) identifying, by the presenting bank computer program, the payor bank routing number from the machine-readable optical label; and (5) routing, by the presenting bank computer program, the check to the payor bank associated with the payor bank routing number.

20 Claims, 5 Drawing Sheets

JOHN DOE
124 STREET NAME
CITY, STATE - 12345

1177

DATE

PAY TO THE
ORDER OF $

DOLLARS

MEMO

SYSTEMS AND METHODS FOR PROCESSING CHECKS WITH MACHINE-READABLE OPTICAL LABELS

RELATED APPLICATIONS

This application is continuation of U.S. patent application Ser. No. 17/663,174, now U.S. Pat. No. 12,189,810, filed May 12, 2022, the disclosure of which is hereby incorporated, by reference, in its entirety.

BACKGROUND OF THE INVENTION

1. Field of the Invention

Embodiments generally relate to systems and methods for processing checks with machine-readable optical labels.

2. Description of the Related Art

Personal checks are a treasure trove of personal information as they are printed with an account holder's name, address, and sometimes phone number and social security number, as well as the routing number for the bank and the account number. The presence of all of this personal information in one place creates an opportunity for malicious users or fraudsters to cause damage to financial institutions and their account holders.

SUMMARY OF THE INVENTION

Systems and methods for processing checks with machine-readable optical labels are disclosed. In one embodiment, a method for processing checks with machine-readable optical labels may include (1) receiving, by a presenting bank computer program executed by an electronic device, a check comprising a machine-readable optical label printed thereon, wherein the machine-readable optical label comprises a payor bank routing number that is encrypted with a private key for a payor bank; (2) reading, by the presenting bank computer program, the machine-readable optical label; (3) decrypting, by the presenting bank computer program, the machine-readable optical label using a public key corresponding to the private key; (4) identifying, by the presenting bank computer program, the payor bank routing number from the machine-readable optical label; and (5) routing, by the presenting bank computer program, the check to the payor bank associated with the payor bank routing number.

In one embodiment, the machine-readable optical label further may include check information encrypted with the private key for the payor bank.

In one embodiment, the check information may be selected from the group consisting of an account holder's name, an account holder's address, an account number, and a check number.

In one embodiment, the check may be received as a check image.

In one embodiment, the check may include a second machine-readable optical label printed thereon, and the second machine-readable optical label may include an account number.

In one embodiment, the account number may be encrypted with a second private key for the payor bank.

In one embodiment, the machine-readable optical label may include a quick response (QR) code.

According to another embodiment, a method for mobile device check deposit may include: (1) receiving, by a payor bank computer program executed by an electronic device for a payor bank, a check from a presenting bank computer program comprising a machine-readable optical label, wherein the machine-readable optical label comprises an account number that is encrypted with a private key for the payor bank; (2) reading, by the payor bank computer program, the machine-readable optical label; (3) decrypting, by the payor bank computer program, the machine-readable optical label using the payor bank private key; (4) identifying, by the payor bank computer program, the account number from the machine-readable optical label; and (5) settling, by the payor bank computer program, the check with the presenting bank using the account.

In one embodiment, the check may also include a second machine-readable optical label printed thereon comprising a payor bank routing number.

In one embodiment, the payor bank routing number may be encrypted with the private key.

In one embodiment, the payor bank routing number may be encrypted with a second private key for the payor bank.

In one embodiment, the machine-readable optical label may also include check information encrypted with the private key for the payor bank.

In one embodiment, the check information may be selected from the group consisting of an account holder's name, an account holder's address, an account number, and a check number.

In one embodiment, the check may be received as a check image.

In one embodiment, the machine-readable optical label may include a quick response (QR) code.

According to another embodiment, a non-transitory computer readable storage medium, including instructions stored thereon, which when read and executed by one or more computers cause the one or more computers to perform steps comprising: (1) receive an image of a check comprising a machine-readable optical label printed thereon, wherein the machine-readable optical label comprises a payor bank routing number that is encrypted with a private key for a payor bank; (2) read the machine-readable optical label; (3) decrypt the machine-readable optical label using a public key corresponding to the private key; (4) identify the payor bank routing number from the machine-readable optical label; and (5) route the check to the payor bank associated with the payor bank routing number.

In one embodiment, the machine-readable optical label may also include comprises check information encrypted with the private key for the payor bank.

In one embodiment, the check information may be selected from the group consisting of an account holder's name, an account holder's address, an account number, and a check number.

In one embodiment, the check may include a second machine-readable optical label printed thereon, and the second machine-readable optical label comprises an account number, wherein the account number is encrypted with a second private key for the payor bank.

In one embodiment, the machine-readable optical label may include a quick response (QR) code.

BRIEF DESCRIPTION OF THE DRAWINGS

In order to facilitate a fuller understanding of the present invention, reference is now made to the attached drawings in which:

FIGS. 2A-2E illustrate examples of checks with machine-readable optical labels according to embodiments.

DETAILED DESCRIPTION OF PREFERRED EMBODIMENTS

Systems and methods for processing checks with machine-readable optical labels are disclosed.

Figure 1:
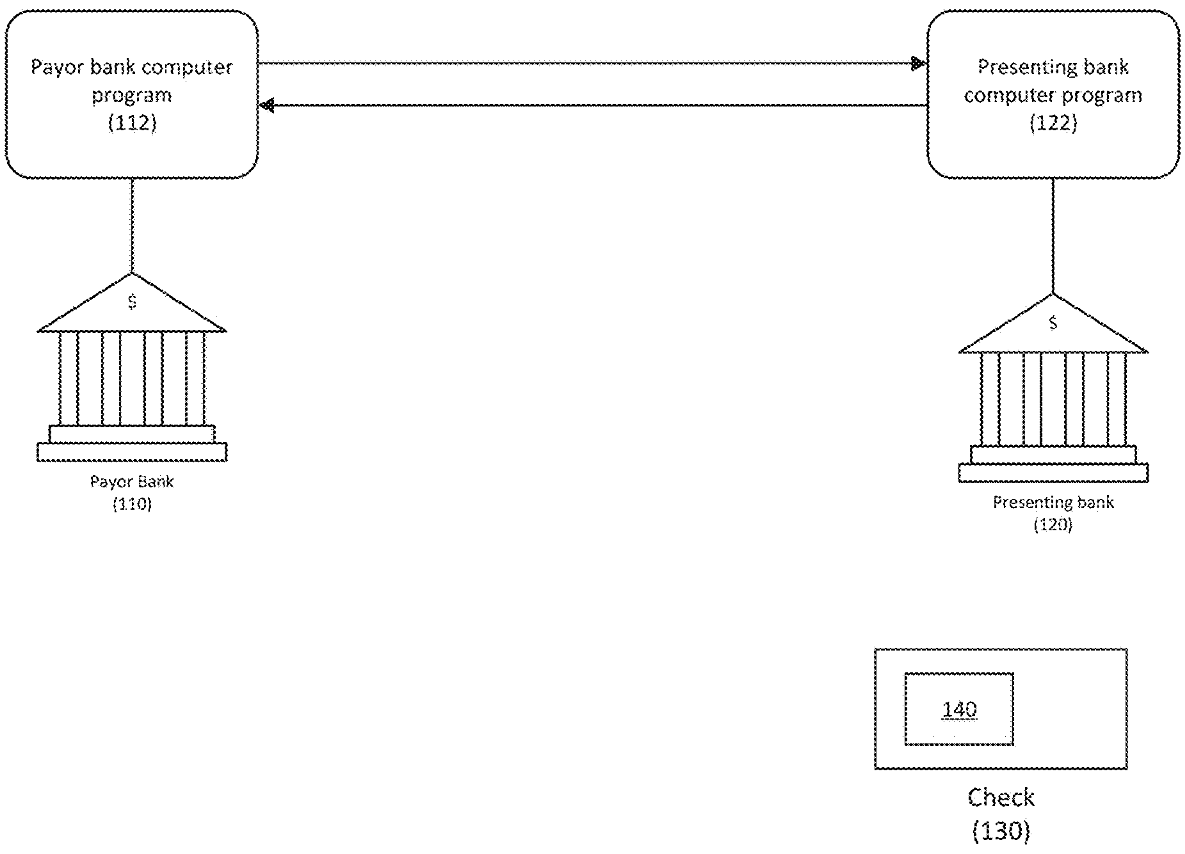
FIG. 1 discloses a system for processing checks with machine-readable optical labels according to one embodiment.

Referring to FIG. 1, a system for processing checks with machine-readable optical labels is disclosed according to one embodiment. System 100 may include payor bank 110 and presenting bank 120 that may execute payor bank computer program 112 and presenting bank computer program 122, respectively. Payor bank 110 may be a bank or financial institution on which a check, such as check 130, may be drawn, and presenting bank 120 may be a bank at which check 130 is presented for payment. Check 130 may have printed thereon one or more machine-readable optical labels 140, such as a matrix barcode. An example of a matrix barcode is a quick response (QR) code.

Bank computer program 112 and presenting bank computer program 122 may be a computer program executed by their respective banks that receive and process check 130. In one embodiment, Bank computer program 112 and presenting bank computer program 122 may read machine-readable optical label 140 that may be printed on check 130. Machine-readable optical label 140 may include information regarding the account holder's name, address, payor bank's routing number, account number, and check number. In embodiments, all of these elements may be included in machine-readable optical label 130; in another embodiment, only some of these elements may be included. In another embodiment, multiple machine-readable optical labels 140 may be provided, and each may be encrypted with a different key, in a different manner, etc.

In addition, some elements may still be printed on check 130. For example, the account holder's name, bank routing number, and check number may be printed on check 130, and may or may not be included in machine-readable optical label 140.

By having certain elements printed on check 130, such as the account holder's name, an individual's authority to issue check 130 may be verified by a check recipient. Further, the individual may use the check number printed on check 130 for reconciliation purposes.

The information in machine-readable optical label 140 may be encrypted so that only the holder of an appropriate key (e.g., a public key corresponding to the payor bank's private key) may access some or all of the check information in machine-readable optical label.

In one embodiment, the use of encryption, such as the public-private key pair and/or other encryption techniques, may be used to keep certain information normally printed on the check private. Thus, a payor bank routing number, an account number for a payor, etc. may not be available until decrypted by an authorized party using a key, such as a public key.

In one embodiment, it may not be necessary for the payor's account number to be made available to any entity other than the payor bank, so other encryption techniques may be used, the public key may not be shared, etc.

In one embodiment, only certain information in the machine-readable optical label may be encrypted. For example, the account holder's name and/or address and the account number may be encrypted.

In another embodiment, certain information may be encrypted with different keys, or by different encryption methods. For example, the payor bank routing number may be encrypted with a first key, while the account number may be encrypted with a second, different key.

In one embodiment, machine-readable optical label(s) 140 may be presented in place of routing number and account number on the magnetic ink character recognition line (MICR) line on check 130. For example, a separate machine-readable optical label may be provided for each element on a traditional check (e.g., one for account holder's name and/or address, one for the payor bank routing number, one for the account number) and may be located at their traditional locations on the check (e.g., machine-readable optical label for account holder name and address in top left corner, machine-readable optical label for routing number at bottom left followed by machine-readable optical label for account number).

Figures 2A, 2B:
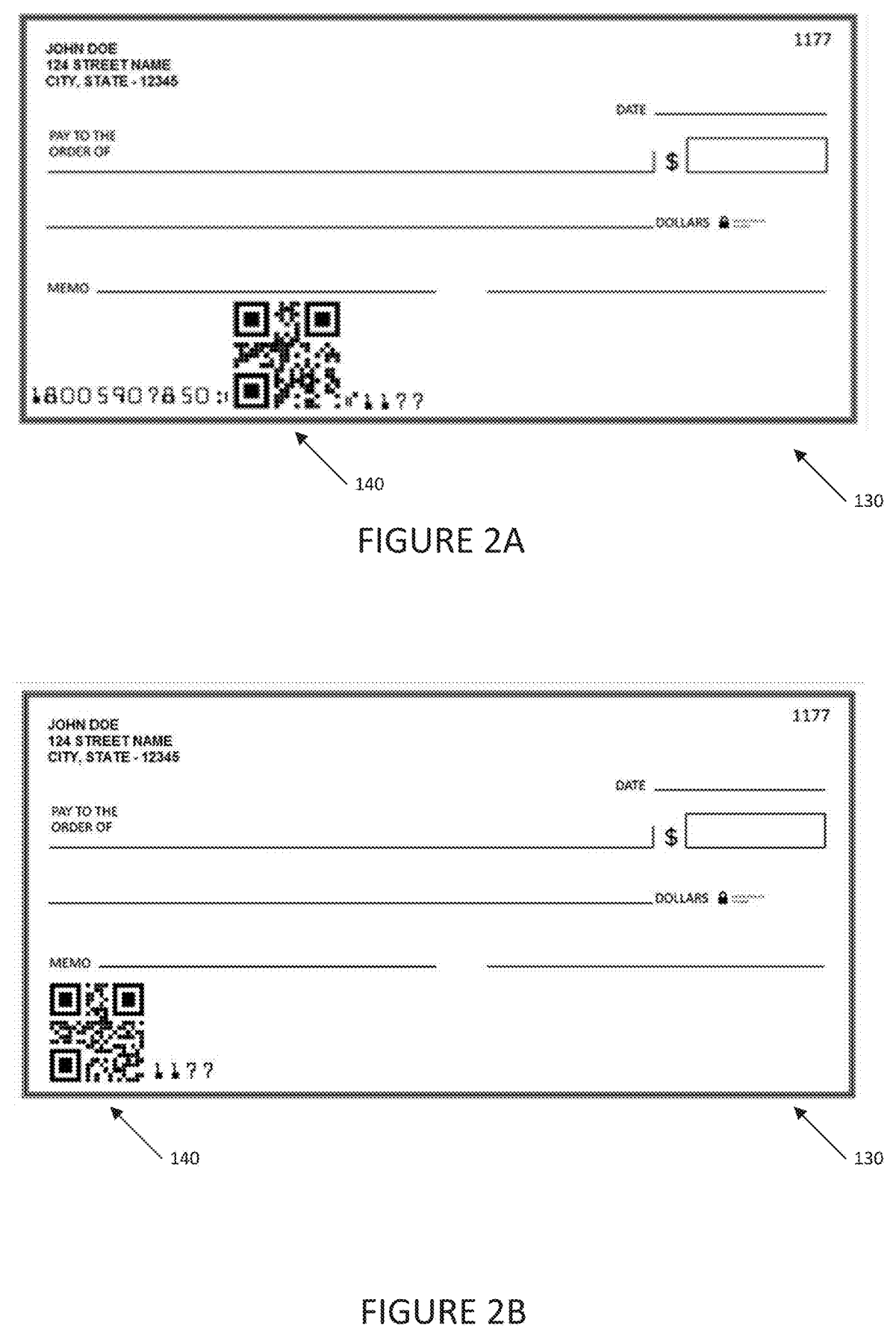

Exemplary illustrations of check 130 including one or more machine-readable optical label 140 are provided in FIGS. 2A-2E. For example, FIG. 2A depicts check 130 in which machine-readable optical label 140 includes at least the account number, while the name, address, routing number, and check number are printed on the check.

FIG. 2B depicts check 130 in which the machine-readable optical label 140 includes at least the routing number and the account number, while the name, address, and check number are printed on the check.

Figures 2C, 2D:
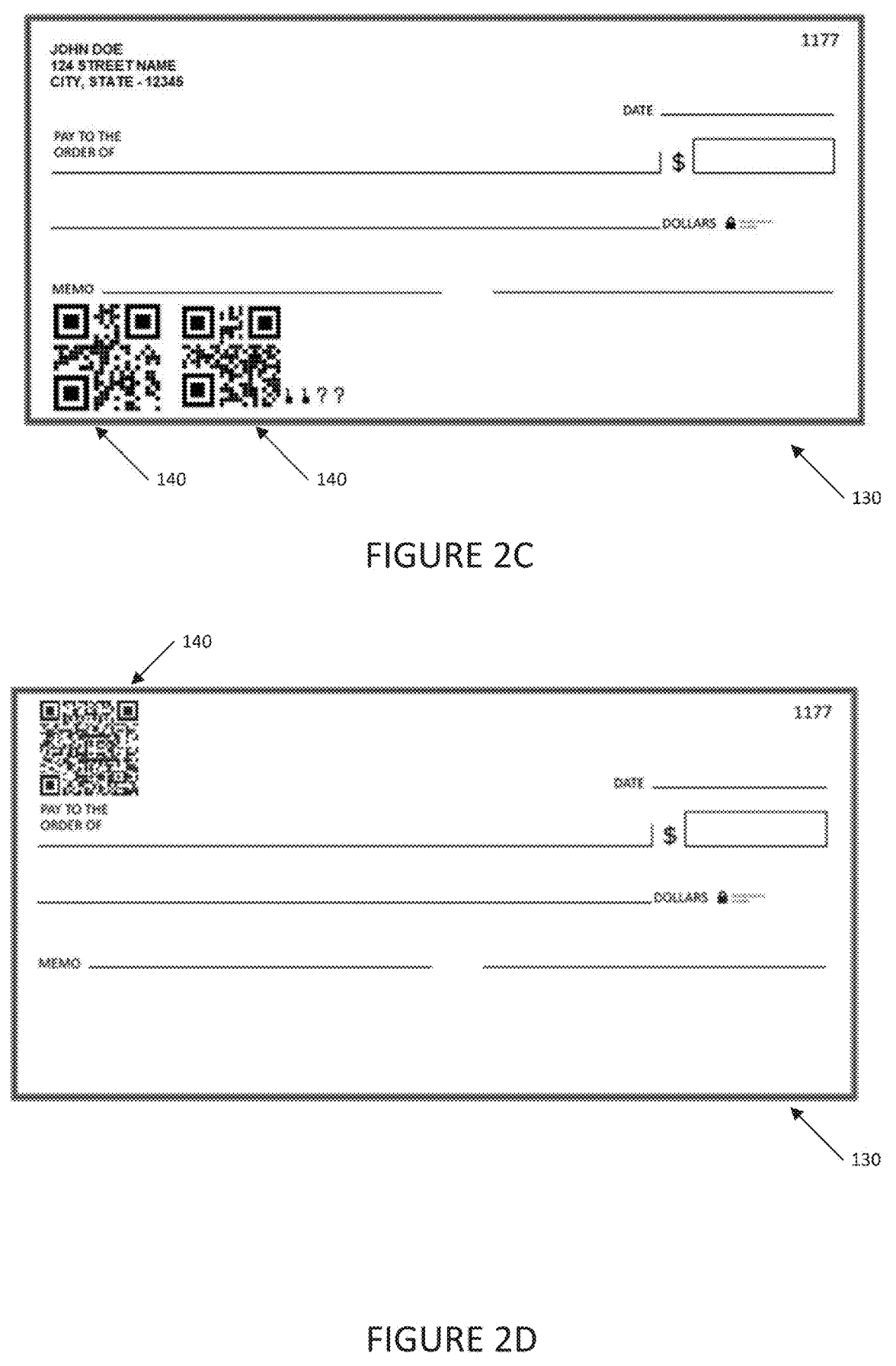

FIG. 2C depicts check 130 in which multiple machine-readable 140 codes are provided. For example, a first machine-readable optical label 140 may include the routing number, and a second machine-readable optical label 140 may include the account number. The name, address, and check number are printed on the check.

FIG. 2D depicts check 130 in which machine-readable optical label 140 includes at least the name, address, routing number, and the account number. The check number is printed on the check.

Figure 2E:
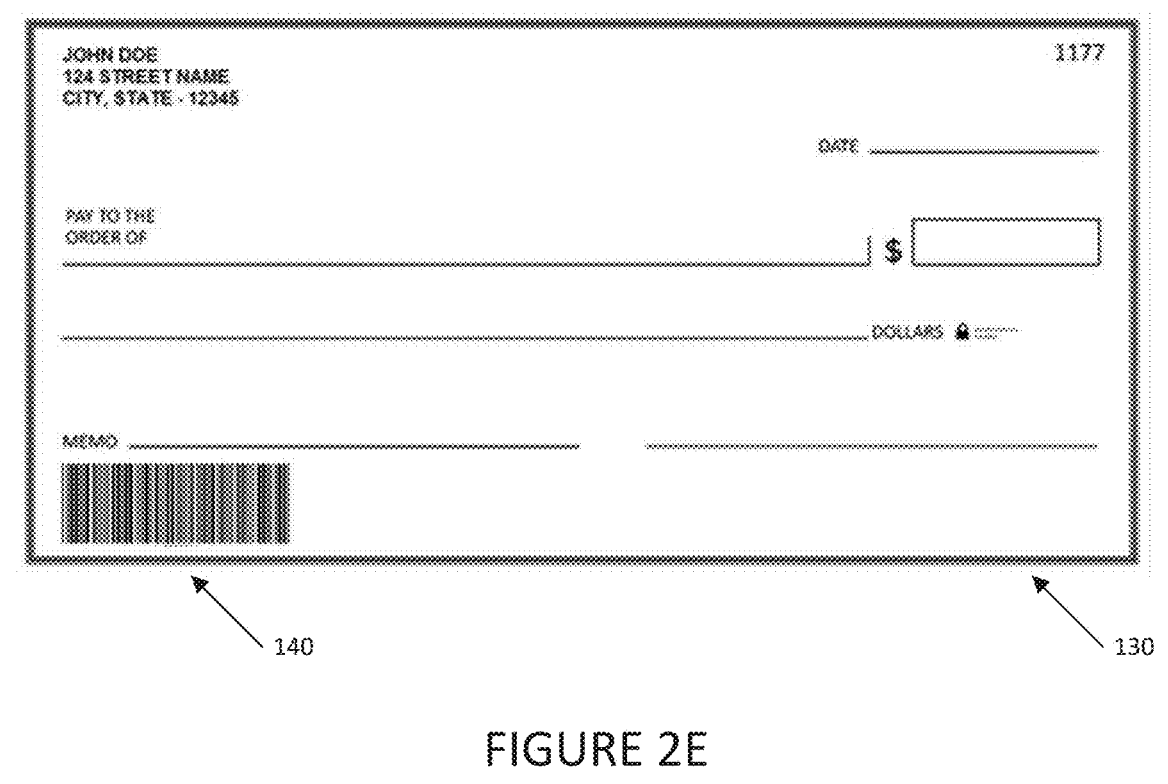

FIG. 2E depicts check 130 in which machine-readable optical label 140 (a bar code) includes at least the routing number and the account number, while the name, address, and check number are printed on the check.

It should be noted that checks 130 in FIGS. 2A-2E are exemplary only, and that machine-readable optical labels 140 may include additional information, may be printed at different locations, etc.

Other examples of checks 130 are disclosed in U.S. Design patent Ser. No. 29/864,184, the disclosure of which is hereby incorporated, by reference, in its entirety.

Figure 3:
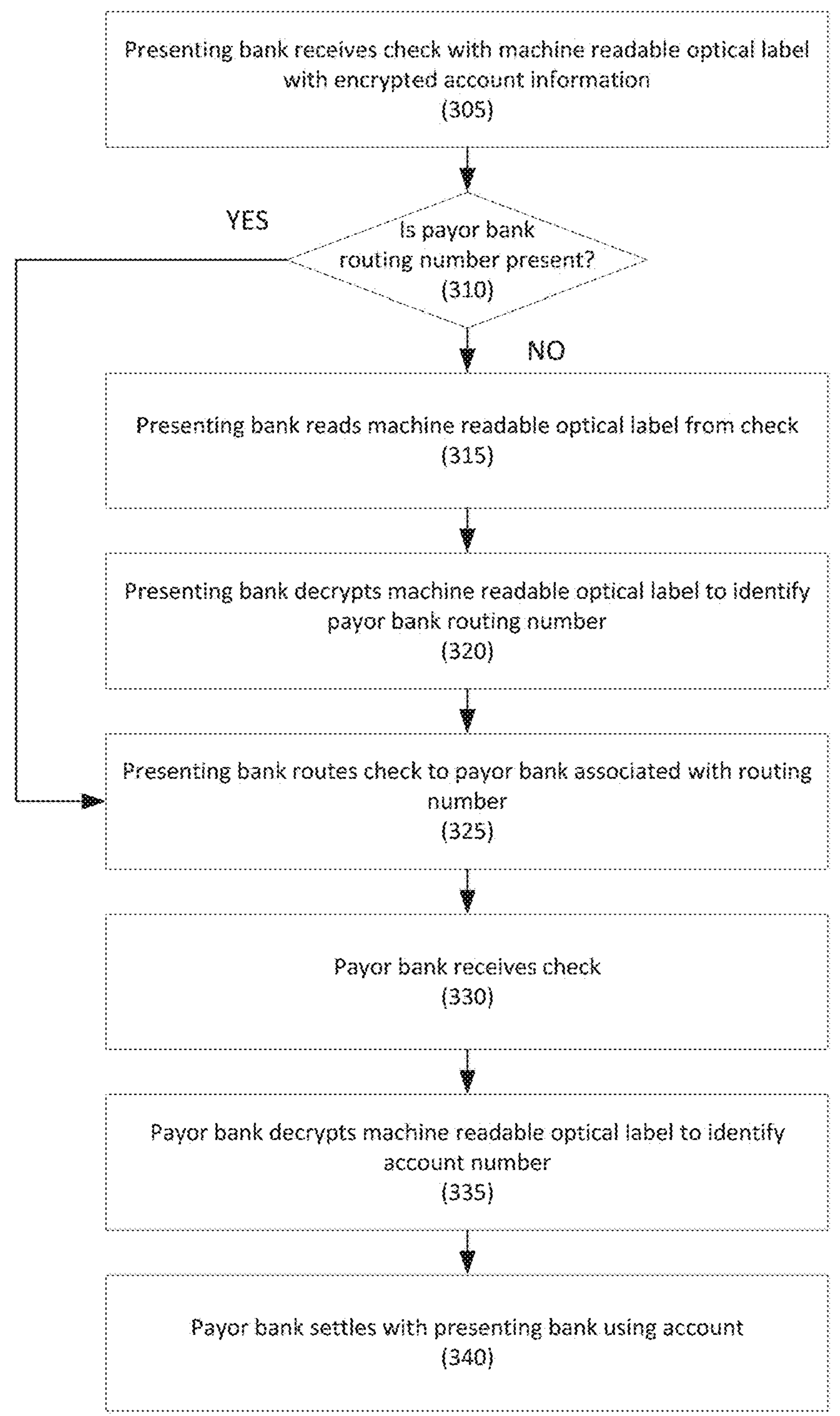
FIG. 3 depicts a method for processing checks with machine-readable optical labels according to one embodiment.

Referring to FIG. 3, a method for processing checks with machine-readable optical labels is disclosed according to one embodiment.

In step 305, a presenting bank may receive a check with a machine-readable optical label. The machine-readable optical label may be encrypted using, for example, the payor bank's private key.

In one embodiment, the machine-readable optical label may include the payor bank's routing number, the account number, and/or the check number. In one embodiment, the paper check, or image of the paper check, may include minimal information, including, for example, the account holder's name, payor bank routing number, and check number.

In one embodiment, multiple machine-readable optical labels may be provided, and each may include different information. For example, the first machine-readable optical label may include the payor bank's routing number and may be encrypted with a first private key for the payor bank. A second machine-readable optical label may include the account number and may be encrypted with a second private key for the payor bank that differs from the first private key. Alternatively, the information in the second machine-readable optical label may be encrypted in a different manner whereby only the payor bank can decrypt the information.

In step 310, a computer program for the presenting bank may determine whether the payor bank routing number is present, for example, in the magnetic ink character recognition line (MICR) line on the check. If it is not, in step 315, the computer program for the presenting bank may read the machine-readable optical label from the check to identify the payor bank routing number. In one embodiment, if the machine-readable optical label is encrypted, in step 320, the computer program for the presenting bank may decrypt the machine-readable optical label using, for example, a public key for the payor bank.

If the payor bank routing number is present on the check, or after the payor bank routing number has been extracted from the machine-readable optical label, in step 325, the computer program for the presenting bank may route the check to the payor bank for processing.

In step 330, the payor bank may receive the check and, in step 335, may decrypt the machine-readable optical label to identify the account number. In one embodiment, a computer program for the payor bank computer may decrypt or otherwise access a second machine-readable optical label to extract the account number.

In step 340, the payor bank may then settle with the presenting bank using standard procedures.

Although several embodiments have been disclosed, these embodiments are not exclusive to each other, and features from one may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disc, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for processing checks with machine-readable optical labels, comprising:

receiving, by a presenting bank computer program executed by an electronic device, a check comprising a machine-readable optical label printed thereon;

determining, by the presenting bank computer program, whether a routing number of a payor bank is present in print on the check, and if not then reading the machine-readable optical label, wherein the machine-readable optical label comprises an account holder name, an account holder address, or an account number, wherein the account holder name, the account holder address, or the account number is encrypted with a private key for a payor bank;

decrypting, by the presenting bank computer program, the machine-readable optical label using a public key corresponding to the private key;

identifying, by the presenting bank computer program, the account holder name, the account holder address, or the account number from the machine-readable optical label; and routing, by the presenting bank computer program, the check to the payor bank associated with the account holder name, the account holder address, or the account number.

2. The method of claim 1, wherein the machine-readable optical label further comprises check information encrypted with the private key for the payor bank.

3. The method of claim 2, wherein the check information comprises an account holder's name, an account holder's address, an account number, and a check number.

4. The method of claim 1, wherein the check is received as a check image.

5. The method of claim 1, wherein the check comprises a second machine-readable optical label printed thereon, and the second machine-readable optical label comprises an account number encrypted with a second private key.

6. The method of claim 5, wherein the account number is encrypted with a second method of encryption known by the payor bank.

7. The method of claim 1, wherein the machine-readable optical label comprises a quick response (QR) code.

8. A method for processing checks with machine-readable optical labels, comprising:

receiving, by a payor bank computer program executed by an electronic device for a payor bank, a check from a presenting bank computer program comprising a machine-readable optical label;

determining, by the presenting bank computer program, whether a routing number of a payor bank is present in print on the check, and if not then reading the machine-readable optical label, wherein the machine-readable optical label comprises an account holder name or an account holder address that is encrypted with a private key for the payor bank;

decrypting, by the payor bank computer program, the machine-readable optical label using the payor bank private key;

identifying, by the payor bank computer program, the account holder name or account holder address from the machine-readable optical label; and settling, by the payor bank computer program, the check with the presenting bank using the account.

9. The method of claim 8, wherein the check further comprises a second machine-readable optical label printed thereon comprising a payor bank routing number encrypted with a second private key.

10. The method of claim 9, wherein the machine-readable optical labels are located on the magnetic ink character recognition line of the check.

11. The method of claim 9, wherein the payor bank routing number is encrypted with a second method of encryption known by the payor bank.

12. The method of claim 9, wherein the machine-readable optical label further comprises check information encrypted with the private key for the payor bank.

13. The method of claim 12, wherein the check information comprises an account holder's name, an account holder's address, an account number, and a check number.

14. The method of claim 9, wherein the check is received as a check image.

15. The method of claim 9, wherein the machine-readable optical label comprises a quick response (QR) code.

16. A method for processing checks with machine-readable optical labels, comprising:

receive an image of a check comprising:

a first machine-readable optical label printed on the check, wherein the first machine-readable optical label comprises an account number that is encrypted with a first private key for a payor bank, a second machine-readable optical label printed on the check, wherein the second machine-readable optical label comprises an account holder name that is encrypted with a second private key for the payor bank;

read the first and second machine-readable optical labels;

decrypt the first and second machine-readable optical labels using a public key corresponding to the first and second private keys;

identify the account number from the first machine-readable optical label and the account holder name from the second machine-readable optical label; and route the check to the payor bank associated with the account number.

17. The method of claim 16, wherein the second machine-readable optical label further comprises an account holder address.

18. The method of claim 16, wherein the second machine-readable optical label further comprises a check number.

19. The method of claim 16, the check comprises a third machine-readable optical label printed thereon, and the third machine-readable optical label comprises a payor bank routing number wherein the payor bank routing number is encrypted with a third private key for the payor bank.

20. The method of claim 16, wherein the first and second machine-readable optical labels each comprise a quick response (QR) code.

* * * * *